United States Patent [19]

Eichelberger et al.

[11] 4,168,531

[45] Sep. 18, 1979

[54] REAL-TIME CLOCK HAVING PROGRAMMABLE TIME INITIALIZATION AND READ-OUT

[75] Inventors: Charles W. Eichelberger; Edward B. Miller, both of Schenectady, N.Y.

[73] Assignee: General Electric Company, Schenectady, N.Y.

[21] Appl. No.: 871,990

[22] Filed: Jan. 24, 1978

[51] Int. Cl.² .............................................. G06F 1/04
[52] U.S. Cl. ................. 364/900; 235/92 T; 235/92 PE; 235/92 DP
[58] Field of Search ... 364/900 MS File, 200 MS File, 364/569; 235/92 T, 92 PE, 92 DP; 58/50 R

[56] References Cited

U.S. PATENT DOCUMENTS

| | | | |
|---|---|---|---|
| 3,813,533 | 5/1974 | Cone et al. | 58/50 R X |
| 3,984,662 | 10/1976 | Sorenson | 235/92 T X |
| 4,060,720 | 11/1977 | Check, Jr. | 235/92 T X |
| 4,065,663 | 12/1977 | Edwards | 364/569 X |
| 4,078,374 | 3/1978 | Konda | 235/92 T X |
| 4,078,376 | 3/1978 | Freeman | 235/92 T X |
| 4,080,780 | 3/1978 | Williams et al. | 58/50 R |
| 4,081,664 | 3/1978 | Washizuka et al. | 364/569 X |
| 4,085,575 | 4/1978 | Tanaka | 58/50 R X |

OTHER PUBLICATIONS

W. Nadler et al., "A Computer Read/Write Clock", in *Computer Design*, vol. 13, No. 9, Sep. 1974, pp. 102, 104, 106.

*Primary Examiner*—Melvin B. Chapnick
*Attorney, Agent, or Firm*—Geoffrey H. Krauss; Joseph T. Cohen; Marvin Snyder

[57] ABSTRACT

A group of selectably-loadable counters is used to derive timekeeping information, for use in an energy load control system, by counting the accurate pulses obtained from a crystal-controlled oscillator and a divider chain. A back-up battery is used to allow the oscillator, dividers and counters to continue the timekeeping function even if normal power, obtained from power mains, is temporarily lost. An address decoder and input/output bus drivers interface with the counters to allow date, hour and minute time information to be routed to, or received from a data bus and under programmable control, when the clock is used in a microcomputer-based system.

6 Claims, 2 Drawing Figures

REAL-TIME CLOCK HAVING PROGRAMMABLE TIME INITIALIZATION AND READ-OUT

BACKGROUND OF THE INVENTION

The present invention relates to timekeeping apparatus and, more particularly, to a novel programmable real-time clock for use in an energy load controller system.

It is known that the quantity of energy consumed, and the cost thereof, in a building can be minimized by allowing energy consumption to occur only at such times as benefit can be obtained therefrom. One approach to minimization of energy consumption in a building, such as an office building and the like, has been to utilize one or more employees, moving through the building, to switch off those loads which represent non-beneficial energy consumption. This approach does not, however, provide rapid control of energy consumption, due to the difficulty and expense of having personnel present at all loads at all times. An automatic system for controlling the energy loads is thus desirable, particularly where such system includes an accurate timekeeping means of high reliability (i.e., continues to keep time even if system power is lost) to addressably provide time data to the system for load control implementation.

BRIEF SUMMARY OF THE INVENTION

In accordance with the invention, there is provided a programmable real-time clock for use in an energy load control system. The real-time clock includes a highly stable oscillator and means for counting the oscillator frequency down to a preselected number of pulses in a predetermined time interval. Counter means are utilized to count the divider pulses to obtain "present-time" data. Preferably, a power back-up means, such as a rechargeable battery and recharging means therefor, is coupled to the commercial power mains supplying power to the real-time clock, whereby the clock continues its timekeeping function even if the commercial mains power is temporarily lost. In this manner, a highly reliable time representation is contained within the timekeeping counters of the clock. The counters contain binary-coded-decimal (BCD) data, based on a 24 hour per day system.

The clock includes means for decoding each of a plurality of addresses. Address data is received from an address bus, typically found in a microcomputer system along with a control bus and a data bus. In a preferred embodiment, the data bus is 8 bits wide whereby a pair of four-bit wide BCD time data words now associated with one of a "minutes" function, an "hour" function and a "day" function are placed on the data bus responsive to receipt and recognition of the particular address assigned to that particular function. Bus drivers are utilized, responsive to the appropriate address and control bus commands, to read the present time data from the counters onto the data bus for use within the system of which the real-time clock preferably forms a part. The counters are of the data-presettable type, whereby time-update data, presented on the data bus, is received by an additional bus driver, associated with each counter, for presetting the data within each of the counters upon receipt of an appropriate signal upon the control bus, thereby allowing the counters to be initialized and/or updated.

Accordingly, it is an object of the present invention to provide a novel programmable real-time clock having accurate and highly reliable timekeeping capability.

This and other objects of the invention will become apparent to those skilled in the art upon consideration of the following detailed description taken in conjunction with the drawings.

DETAILED DESCRIPTION OF THE INVENTION

Figure 1:
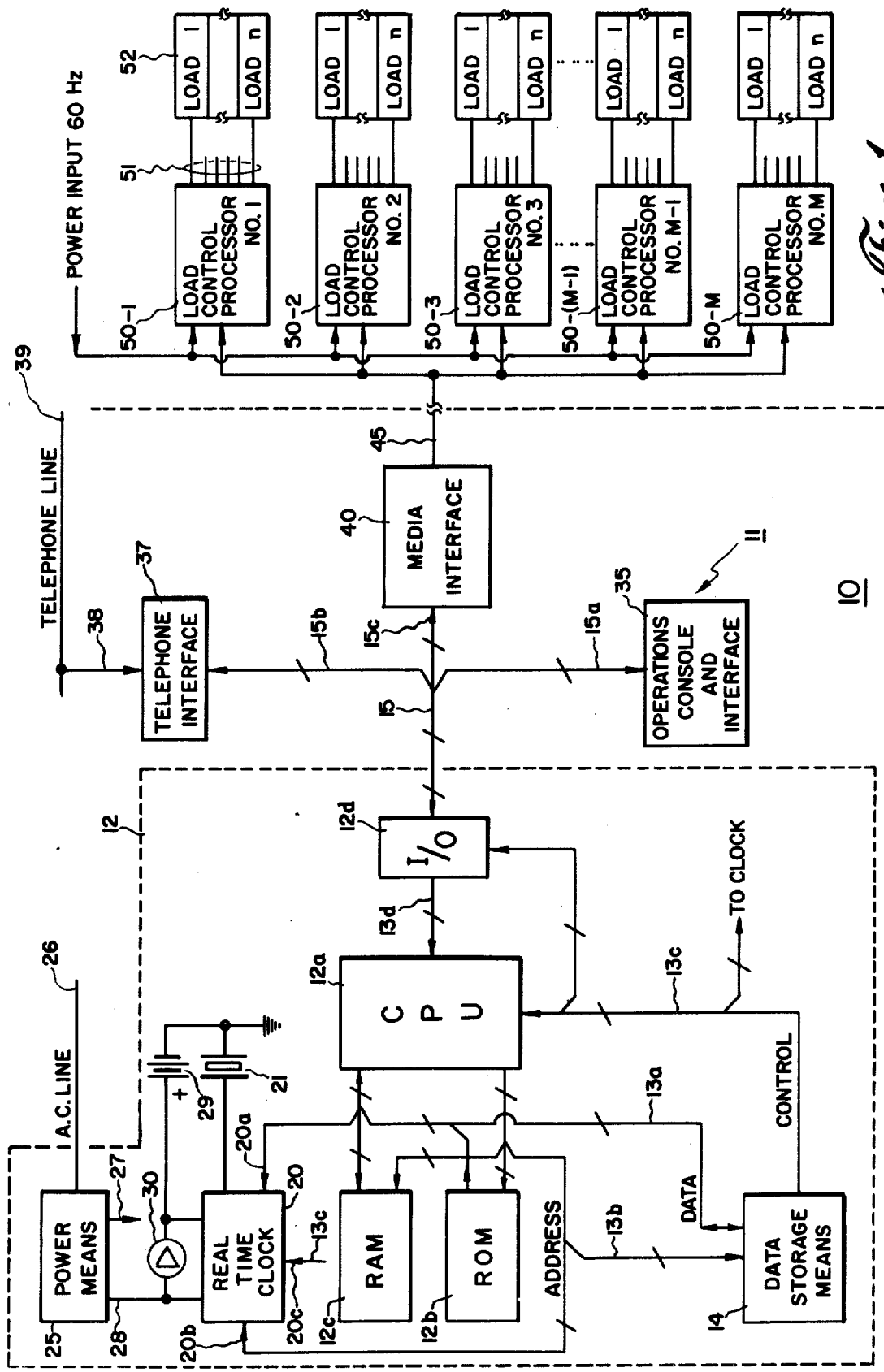
FIG. 1 is a block schematic diagram of a novel programmable energy load controller system using a novel real-time clock in accordance with the principles of the present invention.

An overall block diagram is shown in FIG. 1 of one presently preferred embodiment of a programmable energy load controller system 10. A central facility 11, shown generally to the left of the vertical broken line, comprises a microcomputer 12, such as a standard INTELMDS-800 microcomputer, containing a central processing unit (CPU) 12a; read-only-memory (ROM) means 12b (of about 6 kilobyte capacity); read-write random-access-memory (RAM) means 12c (of about 16 kilobyte capacity); and an input/output (I/O) means 12d. The microcomputer also contains suitable multi-wire signal path structures, commonly known as a data bus 13a, an address bus 13b and a control bus 13c, interconnecting the CPU, ROM, I/O and RAM means, and an I/O bus 13d coupling the CPU and I/O means. The various parallel bus structures 13a, 13B and 13c are coupled to a mass data storage means 14, which may be a magnetic tape transport and controller, a magnetic disk, data cassette transport mechanism and the like, for storage of large quantities of data which may be written into and read from data storage means 14 via data bus 13a, under control of CPU 12a. Data storage means 14 may be physically located within microcomputer 12 or adjacent thereto, with proper coupling of the data, address and control buses thereto.

The data bus 13a is of the bidirectional type, whereby data may be read from data storage means 14 into temporary data storage means such as RAM 12c, or vice-versa, under control of CPU 12a and programs executed therein, in manner known to the computing arts. Data may be received in the microcomputer 12 via a parallel and/or serial input bus (or buses) 15 from sources external to the microcomputer.

Also contained within microcomputer 12 is a real-time clock module 20, utilizing a high-stability crystal element 21, to continuously and accurately establish the time-of-day (TOD) and day-of-week (DOW). Real-time clock means 20 is coupled to bidirectional data bus 13a at clock data port 20a, to address bus 13b at clock address port 20b, and to control bus 13c, at clock control port 20c, to facilitate entry of clock starting time data upon energization of the load controller system of the present invention, and to facilitate reading the TOD and DOW data from clock means 20 when the clock means is interrogated with address codes, at port 20b, corresponding to the unique address codes previously assigned to the clock. Real-time clock means 20 is advantageously fabricated upon a printed circuit board, or other like means, of similar size as that used for mounting the components of the other portions of the microcomputer, and the real-time clock means, along with its timing element 21 and a rechargeable battery means 29, is physically positioned within the confines of the microcomputer at the central facility.

A power supply means 25 is coupled to the AC power line 26 in the building housing the central facility and is coupled to the microcomputer 12, via connections 27 and 28, to provide the required operational voltages and currents. DC power connection 28 provides the real-time clock with operating power derived from the commercial power mains, and is coupled to a back-up battery 29 via a battery charging circuit 30 which allows charging current to flow easily in the direction of the battery such that in the event that AC mains power is lost for any reason, the battery is isolated from means 25 and remains coupled only to real-time clock 20 to assure that the timekeeping function of the clock is maintained. Upon reestablishment of mains power, a bootstrap program directs the CPU to place on address bus 13b the sequential addresses of the clock portions storing TOD and DOW data such that the system will then implement the load energization pattern required for that particular time.

An operations console and interface 35, such as a General Electric TERMINET 30 ® data terminal and the like, is generally physically located near the central computer and is coupled to the I/O bus via bus portion 15a and thence to I/O means 12d of the computer. Console 35 allows system personnel to load, debug and/or modify system programs as well as perform computer diagnostic routines, as required, and in manner known to the art.

A telephone interface means 37, such as a standard AT&T 407A data set and the like, receives tone-coded serial data, coupled via bus 38 to a telephone line 39, which may be a dedicated telephone number in a building-wide telephone system and the like, and decodes this data prior to coupling the data via a portion 15b of the I/O bus to the computer, in manner known to the art.

The central facility is substantially completed by a media interface means 40 serving to couple a portion 15c of the I/O bus to transmission media 45 serving to carry signals representative of data to and from the central facility and the inputs of each of a plurality of remotely-located load control processors 50-1 through 50-M. Media 45 is preferably a cable running between media interface 40 and each of the parallel inputs of the load control processors 50. In our preferred embodiment, transmission medium 45 is a pair of twisted wires, although a coaxial cable may be equally as well utilized.

Each load control processor 50 is assigned an address unique to that load control processor (LCP), even if more than one load control processor is physically located at the same location within the facility. Each of load control processors 50, when properly addressed and enabled, decodes function data transmitted from the central facility thereto, for energization of combinations of the LCP output lines 51 to enable or disable one of a plurality (n) of loads 52 coupled to each LCP. Additionally, in our preferred embodiment, each LCP is configured to not only enable and disable energy consumption by one of the n loads coupled thereto, but also, when our energy load controller system is utilized for controlling lighting functions and the like, to enable each lighting load (a single fixture, bulb and the like) to one of a plurality of different energized conditions. Thus, where a single lighting fixture contains a lighting load capable of being switched between the "off" condition, a low-light "on" condition and a high-light "on" condition, the load control processor associated with each such load is configured to properly place that specific load in the desired one of the plurality of possible energy consumption states.

In our preferred embodiment, each of the Mxn loads is a latching relay associated with either the on-off function or a high lighting level/low lighting level function of each one of a plurality (Mxn/2) of lighting fixtures provided in at least one building to be controlled by our novel system. The number of fixtures controlled by a single LCP is related both to the number of states of energy consumption definable per fixture; the number of bits in a data word defined for the particular CPU utilized in computer facility 12; and the number of function words to be transmitted in a single message to the paralleled plurality of LCPs. In the embodiment herein illustrated, the INTEL MDS-800 microcomputer utilizes the well-known 8080 CPU integrated circuit, for which the data word is defined as being 8 bits (1 byte) wide. We have arbitrarily chosen to send only two data words in serial fashion to each uniquely addressed one of the LCPs; each lighting fixture requires information contained in two binary data bits (the "on-off" function bit and the "high-low" function bit) whereby the on/off states of a set of eight fixtures are controlled by a first data byte and the "on-hi/on-lo" states of the eight fixtures are controlled by the second byte of the preferred two-byte sequential data function message. Of course, it should be understood that other CPUs may be utilized, whereby a particular data word may have more or less bits and that a single data word, or more than two data words in succession, may be as easily transmitted to the paralleled multiplicity of LCPs; other microprocessors CPUs are well known to the art, having four, twelve or sixteen bit data words, and minicomputers and large mainframe computers having data words up to at least sixty-four bits are also known-these CPUs may be utilized within the intent and spirit of the present invention. It should also be understood that other specific load control coding arrangements may be utilized, e.g., a lighting load having an "off" and three "on" conditions (such as a common three-way incandescent bulb and fixture therefor), which four energy utilization state combinations may be coded with the appropriate ones of the four possible combinations available from two sequential binary digits. Similarly, other common non-lighting types of energy consumption loads may be controlled to a lesser or greater degree of possible states, e.g., air conditioning duct dampers may be controlled to one of eight air-flow positions, including zero air flow, by suitable choice of combination of three binary digits in a data word, and so forth.

Further details concerning the operation of the load controller system may be obtained by reference to our copending application Ser. No. 871,989, filed on even date herewith, which is incorporated by reference herein.

Figure 2:
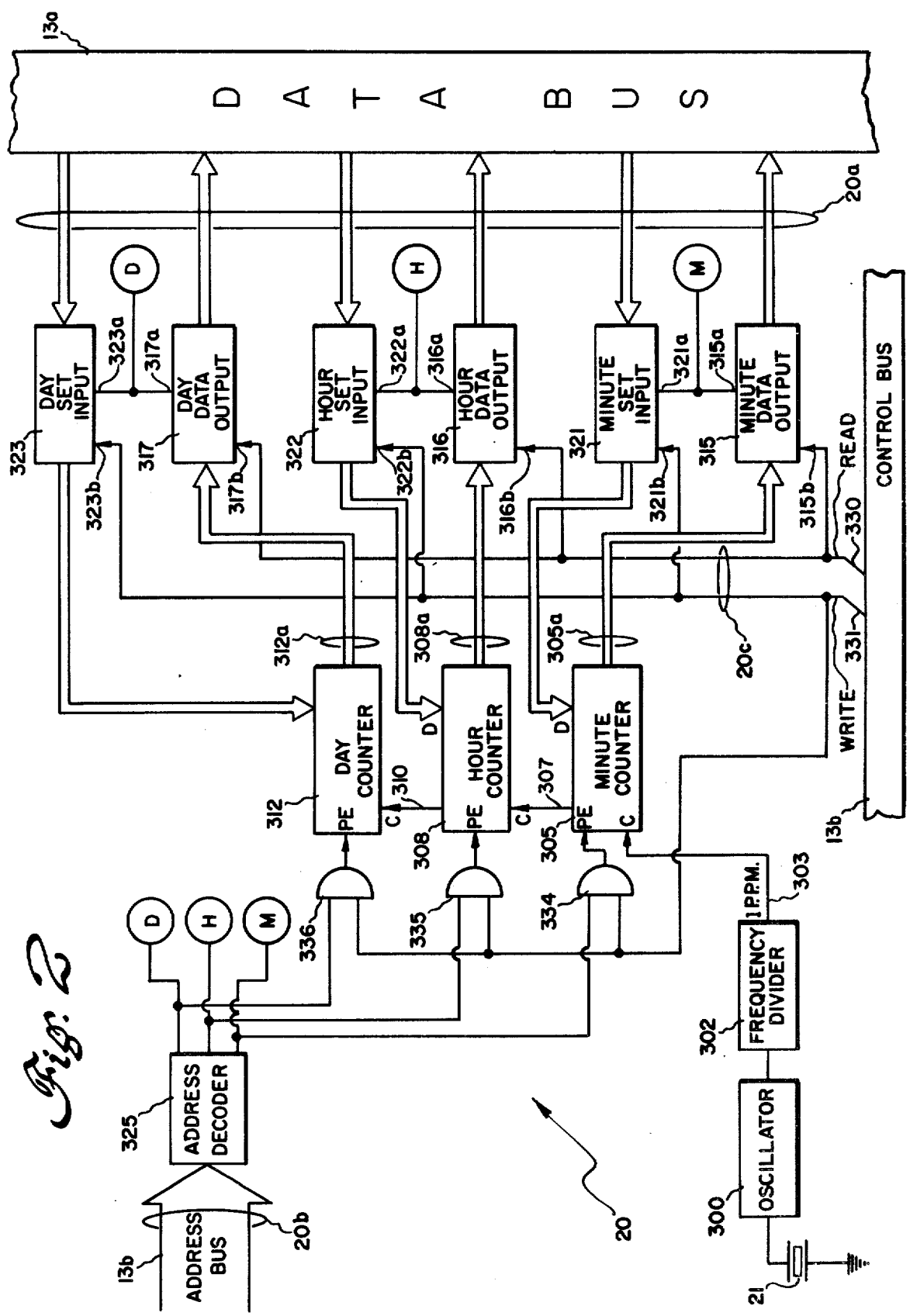
FIG. 2 is a schematic block diagram of one embodiment of a real-time clock for use in the system.

Referring now to FIG. 2, the real-time clock 20, allowing the energy load controller system to implement a particular load energization map at a particular time, comprises an oscillator 300 having its frequency established by means of crystal element 21. The output of oscillator 300 is coupled to a frequency divider 302 which divides the crystal frequency, typically on the order of 32768 Hz., to produce one output pulse each minute, on line 303. The pulses on line 303 are coupled to the count C input of a minute counter 305, configured to count between zero and 59 and to reset to zero on the 60th pulse. The reset-to-zero in counter 305 generates a pulse on a line 307 coupled to the clock input C of an hour counter 308 configured to count from zero to 23 and to reset to zero on a 24th pulse received from line 307. The resetting to zero in hour counter 308 generates a pulse on another line 310, coupled to the count C input of a day counter 312, configured to count sequentially from one to seven and to reset to one on the eighth pulse. Thus, counters 305, 308 and 312 are configured to count the days, hours and minutes of a full seven day week. The data output lines 305a, 308a and 312a, respectively, of the minute, hour and day counters, respectively, are routed to the data inputs of an associated bidirectional bus driver 315, 316 and 317, respectively, which are INTEL 8212 bus drivers in our presently preferred embodiment. The outputs of each of bus drivers 315-317 are coupled to parallel data bus 13a. Data bus 13a is also coupled in parallel to the data inputs of a second set of bidirectional bus drivers 321, 322 and 323, each having its respective parallel data output coupled to the pre-settable data inputs D of the associated minutes, hours and days counters 305, 308 and 312, respectively. Address bus 13b is coupled to an address decoder 325 configured to recognize three unique addresses respectively associated with the day, hour and minute functions; upon recognition of the previously selected addresses, one of address decoder outputs D, H or M is energized. Each of the address decoder outputs D, H and M are routed to a first data strobe input of both bi-directional bus drivers associated with that timekeeping function. Thus, the D address decoder output is routed to the first data strobe inputs 317a and 323a of the day timekeeping function I/O bus driver circuits; while the H address decoder output is coupled to both first data strobe inputs 322a and 316a of the hour bus drivers; and the M output of the address decoder is coupled to both first data strobe inputs 315a and 321a of the minute timekeeping function bus drivers.

The read control line 330 of control bus 13b is coupled to a second data strobe input 315b, 316b and 317b of each of the output bi-directional bus drivers 315-317, respectively. The write control line 331, from control bus 13b, is coupled to the second data strobe inputs 321b, 322b and of the remaining bus drivers, as well as being coupled to one input of each of a set of three two-input AND gates 334, 335 and 336. The remaining inputs of the AND gates are coupled to the associated output of address decoder 325; thus, the remaining input, of gate 334 is coupled to the M output the remaining input of gate 335 is coupled to the H output and the remaining input of gate 336 is coupled to the D output of address decoder 325.

In operation, time data is loaded (written) into real time clock 20 by energizing the write control line 331 and transmitting the address, on address bus 12c, of the time data which is presented on data bus 12b. Address decoder 325 recognizes the proper address and energizes one of the day, hour or minute lines. The energization of write line 331 and one of the D, H or M lines enables one of AND gates 334, 335 or 336 and the associated preset enable (PE) input of the associated one of counters 305, 308 or 312. The data is removed from the data bus and entered into the appropriate bus driver by simultaneous energization of the first input thereof (facilitated by the energization of one of the three address decoder outputs coupled to the first data strobe input of each bus driver) and energization of the second data strobe input coupled to write line 331. The data is taken from the data bus and is transmitted through the appropriate input driver 321, 322 or 323, to the data D input of the appropriate counter. Presence of data at the D data input of the counter along with energization of the PE counter input causes the data to be loaded into the counter and the counter to count from that starting data. By sequentially placing the three sets of data on the data bus with presentation of the associated address on the address bus, the three counters of the real-time clock are loaded with the desired time data.

Time data (in Binary Coded Decimal format) is read out from the real-time clock by causing read line 330 to be energized and issuing the address of the desired timekeeping function: days, hours or minutes. Address decoder 325 recognizes the address and raises the appropriate output line, and enables one control input of one of bus drivers 315, 316 or 317. As read line 330 is also energized, the remaining control input is enabled and the proper day, hour or minute data output bus driver is caused to transmit data from the appropriate counter output 305a, 308a or 312a, respectively, onto data bus 13a for subsequent utilization by the CPU.

While one presently preferred embodiment of the present invention has been disclosed herein, various modifications and variations will now become apparent to those skilled in the art. It is our intent, therefore, to be limited only by the appending claims and not by the specifics of the single embodiment presented herein.

What is claimed is:

1. A real-time clock for furnishing time information in a programmable system having a data bus, an address bus and a control bus, said clock comprising:
   first means for producing a fixed number of pulses during a predetermined time interval;
   second means for continuously counting the number of pulses produced by said first means to increment an initial count preset into said second means and establish the time elapsed after said second means has commenced counting;
   third means for receiving from said data bus a count representative of the present time and for presetting said count, responsive to a time initialization command, into said second means as said initial count to cause the continuous count of said second means to contain data indicating real-time;
   fourth means for reading the real-time data from said second means onto said data bus responsive to a time data request;
   an address port coupled to said address bus for receiving address information;
   a command port coupled to said control bus for receiving command information; and
   means for decoding the address and command information to provide one of said time initialization command and time data request respectively to said third and fourth means to respectively write and read time data respectively into and out of said second means.

2. A clock as set forth in claim 1, wherein said second means comprises a plurality of counters each having a clock input and an output enabled when a preselected number of enablements of said clock input occur, the clock input of a first counter coupled to said first means and the clock inputs of each succeeding counter coupled directly to the output of the preceding counter.

3. A clock as set forth in claim 2, wherein said third means comprises a like plurality of means for transferring information from a data port coupled to said data bus into an associated one of said plurality of counters; and said fourth means comprises a like plurality of means for transferring data from an associated one of said counters to said data port.

4. A clock as set forth in claim 2, wherein said plurality consists of three counters; said first means producing a 1 pulse per minute output; the first counter being a minute counter and continuously counting the integers from 0 to 59 with a reset on the 60th pulse to a count of 0; the second counter being an hour counter and continuously counting the integers from 0 to 23 with a reset on the 24th pulse to a count of 0; and the third counter being a day counter and continuously counting the integers from 1 to 7 with a reset on the 8th pulse to a count of 1.

5. A clock as set forth in claim 4, wherein each counter includes means for presetting the count therein responsive to the data received from a data port via said third means.

6. A clock as set forth in claim 5, wherein said decoding means selects only one of said counters and the associated third and fourth means for enabling data transfer in only a single direction to and from said data port at a particular time.

* * * * *